(12) United States Patent
Schwamm

(10) Patent No.: US 6,480,780 B1
(45) Date of Patent: Nov. 12, 2002

(54) REGULATOR OR ENGINE REGULATOR, ENGINE AND A METHOD FOR REGULATING AN ACTUATING OR PROPULSION SYSTEM AND AN ENGINE

(75) Inventor: Friedrich Schwamm, Zorneding (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/720,847

(22) PCT Filed: Apr. 27, 2000

(86) PCT No.: PCT/DE00/01318

§ 371 (c)(1),
(2), (4) Date: Mar. 26, 2001

(87) PCT Pub. No.: WO00/67080

PCT Pub. Date: Nov. 9, 2000

(30) Foreign Application Priority Data

Apr. 29, 1999 (DE) .......................... 199 19 504

(51) Int. Cl.⁷ .............................................. G06F 19/00
(52) U.S. Cl. ........................... 701/100; 701/36; 701/63; 123/319; 123/352
(58) Field of Search ............................. 701/36, 48, 63, 701/84, 100, 102; 123/319, 352, 399, 478, 480

(56) References Cited

U.S. PATENT DOCUMENTS

| 5,067,080 | A | | 11/1991 | Farman | |
| 5,150,690 | A | * | 9/1992 | Carter et al. | 123/527 |
| 5,339,782 | A | * | 8/1994 | Golzer et al. | 123/399 |
| 5,613,064 | A | | 3/1997 | Curtin | |
| 5,719,764 | A | | 2/1998 | McClary | |
| 5,895,434 | A | * | 4/1999 | Fennel et al. | 701/48 |

FOREIGN PATENT DOCUMENTS

| DE | 39 26 377 | 2/1991 |
| DE | 41 13 959 | 11/1992 |
| DE | 41 33 268 | 4/1993 |
| DE | 43 14 118 | 11/1994 |
| DE | 44 39 060 | 5/1998 |
| EP | 0 186 613 | 7/1986 |

* cited by examiner

Primary Examiner—Gertrude Arthur
(74) Attorney, Agent, or Firm—Kenyon & Kenyon

(57) ABSTRACT

A regulator or engine regulator having two regulator channels (20, 20') which each have at least two processor units (22, 24 or 22', 24', respectively) is developed in that in each case one processor unit (for example 22, 22') operates as a calculation unit for each safety-critical function in both regulator channels (20, 20'), in order to determine calculation results from at least some of the input data (E, E'), and in each case one other processor unit (for example 24, 24') operates as a monitoring unit in order to compare the calculation results from the calculation unit firstly with its own estimate of the correct results and secondly with corresponding results from the respective other regulator channel (20', 20). An engine and method for regulating an actuating or propulsion system, or an engine, have corresponding features. The invention improves the operational safety in particular of a two-channel regulator or an engine regulator with little complexity, and, in particular, allows reliable identification of malfunctions in one channel.

21 Claims, 3 Drawing Sheets

REGULATOR OR ENGINE REGULATOR, ENGINE AND A METHOD FOR REGULATING AN ACTUATING OR PROPULSION SYSTEM AND AN ENGINE

FIELD OF THE INVENTION

The present invention relates to an engine regulator, an engine and a method for regulating an engine. The present invention is intended in particular for use in aeroengines, in which flight-critical electronic and/or digital closed-loop control is used (so-called FADEC/engines—full authority digital engine control) . The present invention is very particularly suitable for aeroengines which are used in single-engine aircraft or for propulsion systems with thrust vector control. The present invention furthermore relates to a regulator for safety-critical, very high reliability applications, for example for closed-loop control systems for use in aviation or in nuclear power stations, an actuating or propulsion system, and a method for regulating an actuating or propulsion system.

BACKGROUND INFORMATION

A two-channel configuration of the engine regulator is known for FADEC engines. This means that all those components which are essential for operation are duplicated. Such components are, in particular, important sensors and actuators for the engine assembly and controlled system, hardware for signal conditioning and signal conversion, and the actual processor units for carrying out the control method. This is equally applicable to two-channel regulators, which are used in safety-critical or very high reliability applications.

A two-channel regulator or engine regulator provides a redundancy level which is in principle sufficient even for safety-critical applications. With modern circuit technology, the risk of failure of both channels is negligibly low. However, there is a difficulty in reliably identifying failure of one channel. While, for example, with a three-channel regulator or engine regulator, it is possible to compare the actuating signals produced by each channel and to make a majority decision, it is not possible to identify just from a pure error between the actuating signals in a two-channel regulator which of the channels has a malfunction.

For these reasons, the prior art provides for essentially autonomous monitoring within each of the two channels in two-channel engine regulators. This means that the functional monitoring of each channel is carried out by way of plausibility checks in which the data from the respective other channel can admittedly be included for fault identification, but can have no authority in terms of fault Localization and fault reactions. Such plausibility checks and other channel -autonomous monitoring systems with high fault identification reliability are available for sensor systems, actuator systems and the hardware for signal conditioning and signal conversion.

Even with regard to the processor units, some fault situations can be monitored relatively easily and reliably. For example, a complete functional failure (crash) of a processor unit can be identified by providing a monitoring timer which is regularly reset by the processor unit. An alarm is triggered if the reset process does not take place before a time interval governed by the timer has elapsed. other malfunctions can be identified, for example, by bus monitoring logic.

However, there is a problem in that some processor unit faults can be identified only with difficulty. This relates in particular to malfunctions which occur only sporadically or when the processor is in specific operating states. Thus, for example, the resistance of metallization can increase gradually due to corrosion. Initially, this can lead to temporary faults which, for example, occur only when the processor supply voltage falls somewhat below the normal value, or rises above this value, in some flight situations or in particular operating states, such as during engine starting. Such faults, which may also be early indicators of a permanent failure, can lead with a relatively high degree of probability to dangerous malfunctions, and can be determined only with difficulty in two-channel engine regulators.

SUMMARY OF THE INVENTION

An object of the present invention is accordingly to avoid the above-mentioned problems, and to improve the operational safety in particular of a two-channel regulator or engine regulator, with little complexity. In particular, the present invention is intended to allow reliable identification of dangerous processor malfunctions.

According to the present invention, this' object is achieved by an engine regulator or regulator having the features of claim 1 or 11, respectively, by an engine having the features of claim 8, and by a method for regulating an engine or an actuating or propulsion system and having the features of claim 9 or 19, respectively. The dependent claims relate to preferred refinements of the invention.

The present invention is based on the fundamental idea of comparing calculation results in one channel of the regulator or engine regulator firstly with a channel internal estimate of the correct results, and secondly with the results from the respective other regulator channel. Two checks are thus carried out, namely channel-internally for plausibility, and channel-externally by way of a comparison of results. This results in fault identification with similar reliability to that achieved with a three-channel regulator design being achieved without a third regulator channel.

The present invention provides that each regulator channel has at least two processor units, of which in each case one operates as a calculation unit for its own calculation process for each function to be checked, and another operates as a monitoring unit. The calculation unit and the monitoring unit carry out both the channel-internal plausibility check of the results of the calculation unit, and the comparison with the results from the other channel. This measure ensures that the two monitoring activities take place independently of any possible malfunction in the calculation unit or in the monitoring unit.

The presence of a number of processor units per channel provides the required computation performance. Even taking account of the expected growth in computation capacities, at least two processor units will be desirable per channel even in the future, in order to allow software with different criticality levels to be mutually separated. Subject to these boundary conditions, no additional hardware complexity is required for the solution according to the present invention. The present invention can have a particularly advantageous cost-effectiveness ratio in other constellations as well.

Thus, overall, the present invention ensures reliable identification of computer failures with the minimum possible effect on the capability to use the installed computation performance. Each processor unit in both regulator channels requires only a small portion of its computation capacity for its tasks as a monitoring unit. The vast majority of the computation capacity can be used by the processor unit to carry out complex control processes for other control loops or other functions, as a calculation unit.

Each monitoring unit preferably has a fault integrator which integrates errors determined during the comparisons, and thus integrates other indicator values for malfunctions. The integration rate is in this case preferably dependent on the severity of the error or malfunction. The error value determined by the fault integrator preferably decays gradually if no further malfunctions occur.

Any error determined during the comparisons is preferably reacted to only if both comparisons indicate a malfunction of the channel being monitored. This allows the respective faulty channel to be determined reliably.

In preferred embodiments, the checked calculation results are output data from the calculation units, actuating signals, or intermediate signals.

The present invention is preferably suitable for applications in which defects in a digital engine regulator can lead to "dangerous" engine or system malfunctions. This relates in particular to single-engine aircraft or aircraft with thrust-vector control since, in this case, inadvertent engine failure or an incorrectly controlled thrust vector can lead to loss of the aircraft. In other applications, for example multi-engine civil aircraft, there are generally "safe" authority limitations for FADEC systems (for example speed limiter independent of the FADEC system). Although the use of the present invention is desirable for such applications, it is not absolutely essential.

An actuating or propulsion system comprises actuators, sensors and a regulator according to the present invention. The actuators, such as electromechanical actuating motors, pumps or the like, are used to control the system. The sensors, for example for measuring positions, temperatures, rotation speeds or the like, are used for detecting the system state (actual state), which is processed further in the regulator in order to form actuating signals. Such actuating or propulsion systems are used for safety-critical applications. These include, for example, the control system for an electromechanical aircraft door, the closed-loop control system for steady-state gas turbines and flight control systems which are used for aircraft navigation. Particularly in the case of highly safety-critical applications, which demand high functional availability, such as FADEC systems for single-engine aircraft, flight control systems or thrust-vector controllers, there is a dissimilarity between the processor modules in the two regulator channels.

DETAILED DESCRIPTION

Figure 1:
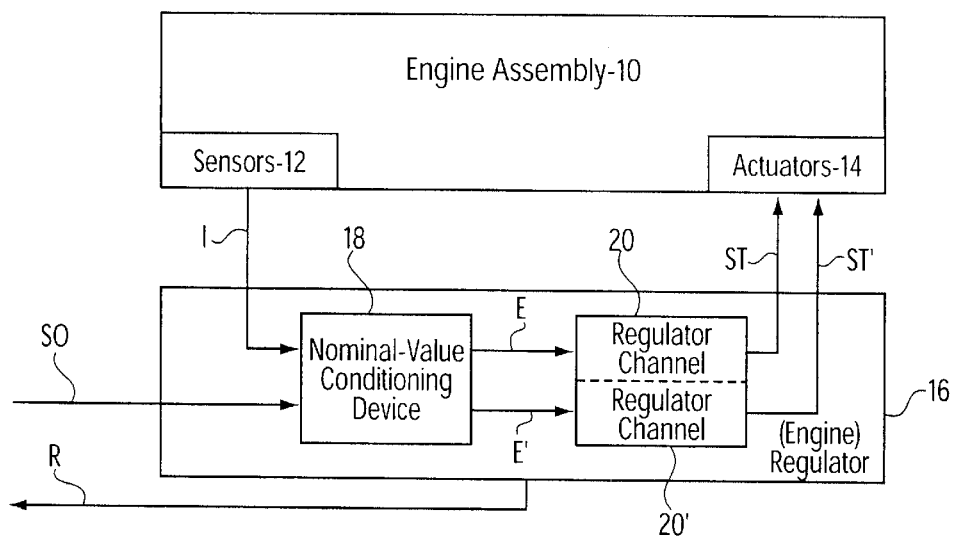
FIG. 1 shows a highly simplified block diagram of an aeroengine with associated assemblies for engine control.

FIG. 1 shows an aeroengine for a single-engine application with thrust vector control. The aeroengine has an engine assembly 10 with the actual turbine assembly and a large number of sensors 12 and actuators 14. A regulator 16, which acts as the engine regulator, receives actual-value signals I from the sensors 12, and nominal-value signals SO which are calculated from the pilot's control movements by suitable on-board electronics (not shown in FIG. 1). The engine regulator 16 produces actuating signals ST and ST'for the actuators 14 of the engine assembly 10, and feedback signals R for the on-board electronics and the pilot.

The engine regulator 16 has a nominal-value conditioning device 18 which uses the nominal-value signals SO and the actual-value signal I supplied from the sensors 12 to generate two sets of input data E, E1 for a first and a second regulator channel 20, 20', respectively. The two regulator channels 20, 20' together produce the actuating signals ST and ST'. In the exemplary embodiment described here, either the actuating signals ST or the actuating signals ST' are always active (or neither ST nor ST' if there is a very serious functional defect). In alternative configurations, on the other hand, both actuating-signal groups ST, ST' may be output independently from one another in normal operation.

In simple configurations, the nominal-value conditioning device 18 just suitably scales the nominal and actual-value signals SO, I and, if the nominal and actual-value signals SO, I are not already in digital form, carries out analogue /digital conversion. The two sets of input data E, E' are then identical, and each have the information for all the nominal and actual-value signals SO, I. In the simplest, extreme case, the (digital) nominal and actual-value signals SO, I are used directly as input data E and as input data E'. With design variants such as these, there is no need for any separate nominal-value conditioning device 18.

In more complex alternative designs, pairs of redundant sensors 12 are in each case provided, so that at least each important actual-value signal I is determined separately in two channels. A corresponding situation applies to the nominal-value signals SO.

The nominal-value conditioning device 18 in these design alternatives has signal selection logic. Furthermore, the nominal-value conditioning device 18 then contains an arrangement for plausibility checking the nominal and actual-value signals SO, I in both channels. In normal operation, the signal selection logic uses the information from the first channel to produce the input data E, and the information from the second channel to produce the input data E'. However, if values are determined in one channel which, for example, indicate a malfunction of one of the sensors 12, then the nominal-value conditioning device 18 ignores the probably erroneous signals in this channel and, instead, uses the corresponding signals from the other channel in order to produce both input data sets E, E1. To this end, each channel in the nominal-value conditioning device 18 is always provided with the actual-value data I from both channels.

With the level of detail shown in FIG. 1, there is no difference between the aeroengine according to the present invention and the prior art. The only difference is the design and method of operation of the two regulator channels 20, 20' of the engine regulator 16, which are explained in the following text.

Figure 2:
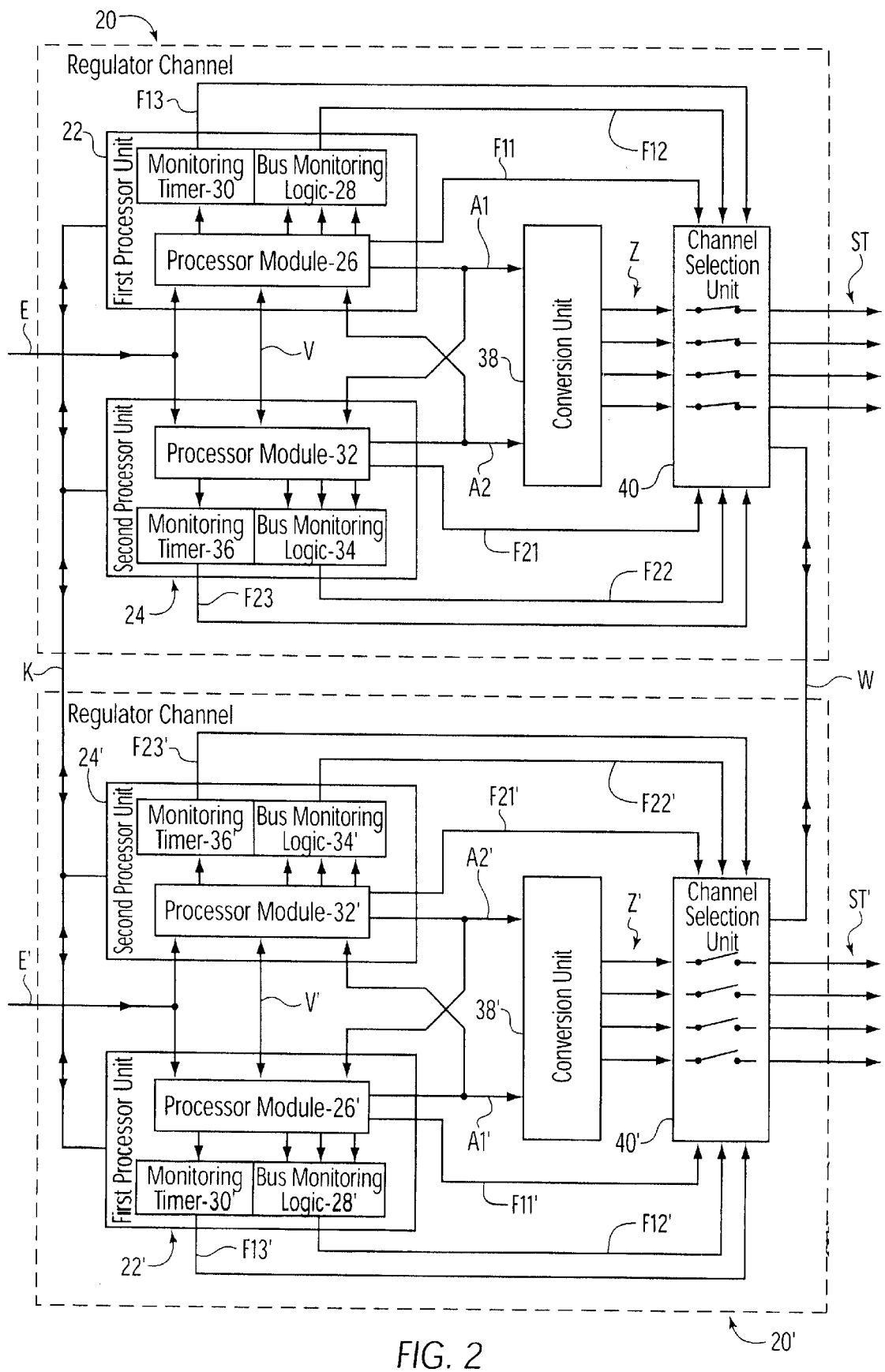
FIG. 2 shows a block diagram of the two regulator channels for a regulator or engine regulator according to the invention.

The block diagram in FIG. 2 shows the two regulator channels 20, 20' schematically. The first regulator channel 20 has two substantially identical processor units 22, 24. The first processor unit 22 contains a processor module 26 which comprises the actual processor, random access memory, program memory containing the software, data and address bus and other components, and thus forms an autonomous computer. In systems which additionally have extremely high functional availability, the processor units should.

The first processor unit 22 furthermore has assemblies for hardware monitoring of the processor module 26, namely, in the exemplary embodiment described here, bus monitoring logic 28 for identifying unacceptable accesses to the buses of the processor module 26, and a monitoring timer (watchdog timer) 30 for identifying a functional failure (crash) of the processor module 26. Other, or additional, monitoring assemblies are provided in design variants.

The second processor unit 24 is equipped, like the first processor unit 22, with a processor module 32, bus monitoring logic 34 and a monitoring timer 36. The two processor units 22, 24 receive identical input data E. Furthermore, the processor units 22, 24 can interchange data via a bidirectional link V.

Figure 4:
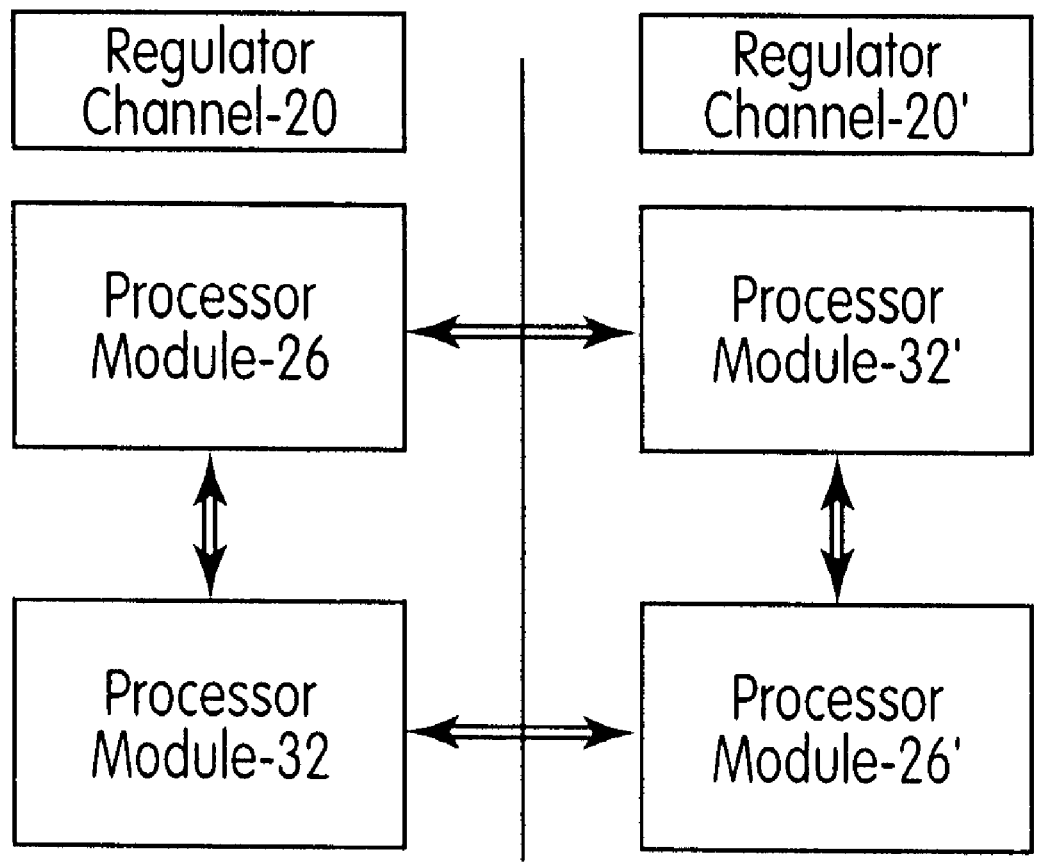
FIG. 4 shows a schematic diagram, illustrating an example of the dissimilarity between the processor modules in each regulator channel.

In systems which also have extremely high functional availability, the processor modules 26, 32 and 26, 32' may be of dissimilar design, for example from different manufacturers, as is shown in the example in FIG. 4.

The computation results from the processor units 22, 24 are provided as output data A1, A2. To be more precise, the output data A1 from the first processor unit 22 are supplied to a conversion unit 38 and to the second processor unit 24. The output data A2 from the second processor unit 24 are applied to the conversion unit 38, and are fed back to the first processor unit 22. The conversion unit 38 scales the output data A1, A2 and carries out signal conditioning (if appropriate including digital /analogue conversion) in a suitable form for the actuators 14 of the engine assembly 1O. Generally, either only the output data A1 or the output data A2 contain control information for each of the actuators 14.

The converted output data A1, A2 are applied as intermediate signals Z to a channel selection unit 40. For its part, the channel selection unit 40 produces the actual actuating signals ST for the actuators 14. In order to allow a fault in the first processor unit 22 to be identified, the channel selection unit 40 receives a fault signal F11 from the processor module 26, a fault signal F12 from the bus monitoring logic 28, and a fault signal F13 from the monitoring timer 30. In order to monitor the second processor unit 24, the channel selection unit 40 receives a fault signal F21 from the processor module 32, a fault signal F22 from the bus monitoring logic 34, and a fault signal F23 from the monitoring timer 36.

The second regulator channel 20' is substantially identical to the first regulator channel 20, which has just been described. Reference should therefore be made to the above description. The reference symbols used for the individual components of the second regulator channel 20' in FIG. 2 differ from those in the first regulator channel 20 only by having an apostrophe attached.

The total of four processing units 22, 24, 22', 24' for the two regulator channels communicate with one another by way of a serial, bidirectional communications link K. The two channel selection units 40, 401 are also linked to one another by a bidirectional link W. This link W results in a flipflop effect between the two channel selection units 40, 40'.

At any given time, only one of the two regulator channels 20, 201 has authority for system control. By way of example, this is the regulator channel 20 in the illustration in FIG. 2. The intermediate signals Z in this regulator channel 20 are then output as actuating signals ST from the channel selection unit 40 which, for example, may have a relay. on the other hand, the other channel selection unit 401 separates the intermediate signals zr from the actuating signal outputs, so that the actuating signals STI are inactive.

After a channel changeover, which is initiated when a functional fault is identified or as a result of a manual command, for example a pilot's command, the relationships are reversed.

The input data E which, derived from the actual-value signals I (FIG. 1) in the regulator channel 20, are passed to both processor units 22, 24, have identical values, provided there is no hardware defect during data transmission or in one of the buffers (memories in the processor units 22, 24) . A corresponding situation applies to the second regulator channel 20'. The input data E, E' for the two regulator channels 20, 20' generally have slightly different values, however. This is due to the fact that the nominal-value conditioning device 18 gives priority to the channel's own signals in the data selection process. Thus, normally, the two regulator channels 20, 201 use slightly different input data sets E, E', which leads to the results (output data) from the channels differing slightly.

Figure 3:
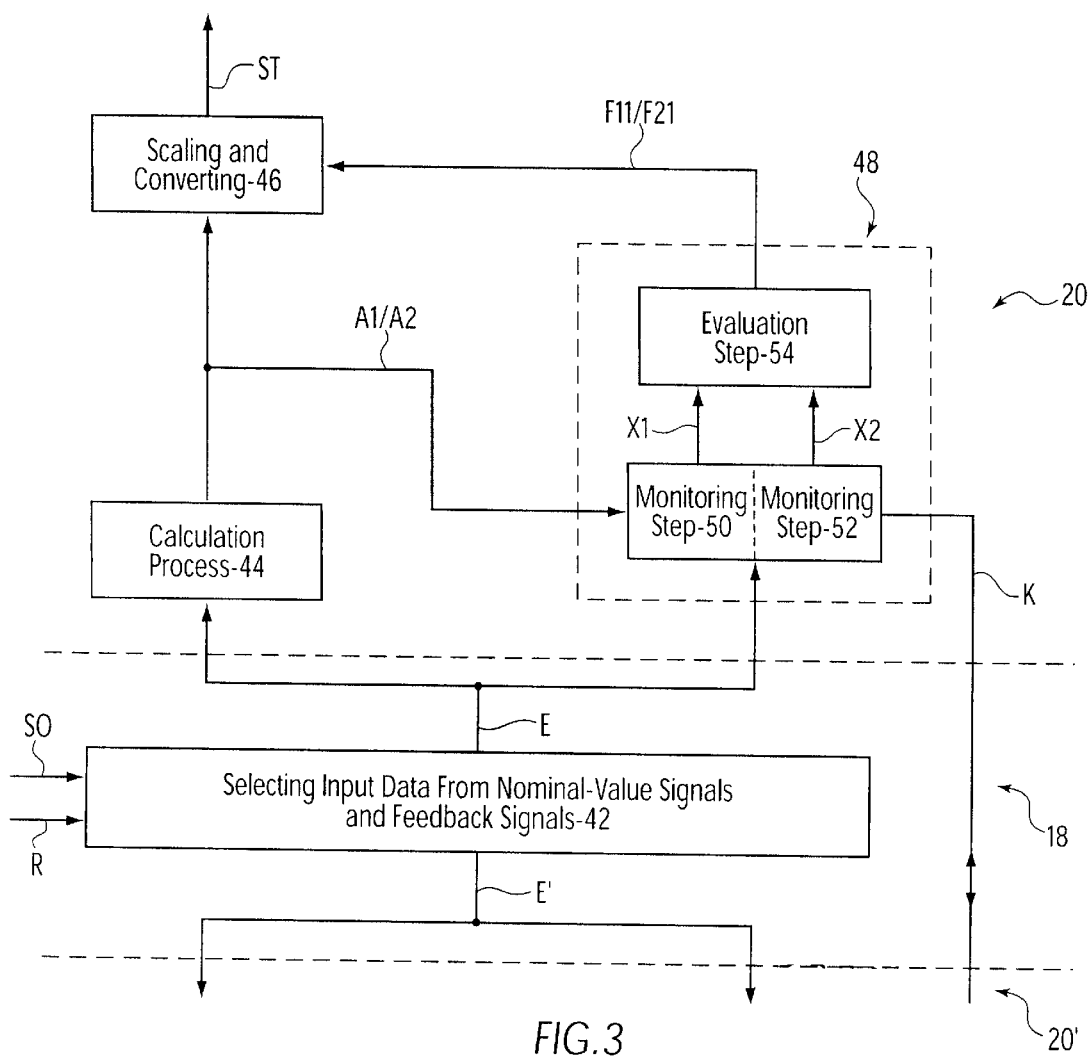
FIG. 3 shows a data flowchart of the calculation method that is used according to FIG. 1 during operation of the regulator or engine regulator.

The operation of the nominal-value conditioning device 18 and of the two regulator channels 20, 201 during operation will now be explained with reference to the data flowchart in FIG. 3. FIG. 3 shows only the common operations, and the processes in the regulator channel 20. The method of operation of the regulator channel 20' is identical to that of the regulator channel 20, so that this will not be described separately in the following text.

In the first step 42, the input data E which will be used as the basis of the calculation are selected from the nominal-value signals SO and the feedback signals R. In the present exemplary embodiment, the step 42 is carried out by the nominal value conditioning device 18 in the manner already described. In design variants, these tasks can be carried out entirely or partially by the two regulator channels 20, 20'.

The illustration of the regulator channel 20 in FIG. 3 shows the data flow in the calculation path on the left, and the data flow in the monitoring path on the right. For each control loop, that is to say for each function to be calculated, one of the two processor units 22, 24 operates as the calculation unit, and the respective other processor unit 22, 24 operates as the monitoring unit. The calculation unit carries out the actual calculation processes (step 44 in FIG. 3), while the monitoring unit monitors the results from the calculation unit, and checks them for faults (Step 48 in FIG. 3).

In general, each of the two processor units 22, 24 carries out a large number of concurrent or virtually parallel processes, and operates as the calculation unit for some control functions, and as the monitoring unit for other computation functions. This allows a uniform load distribution to be achieved since, typically, the calculation is considerably more complex than the monitoring for any given control function. The use of the two processor units 22, 24 as the calculation and monitoring unit, respectively, for each control function is preset in a fixed manner in the present exemplary embodiment, but may also be controlled in a flexible manner (for example as a function of the load) in design variants.

In the calculation step 44, the respective calculation unit processes the input data E in accordance with the control rules which are implemented. In consequence, the calculation unit simulates the desired regulator function. During fault free normal operation, the calculated output data A1 and A2 (depending on which of the processor units 22, 24 is operating as the calculation unit) contain all the information to allow the control signals ST to be determined by way of a scaling and conversion step 46. The step 46 is carried out by the conversion unit 38 and by the channel selection unit 40.

For monitoring, the monitoring unit receives the input data E, the output data A1 or A2 determined by the calculation unit, and (via the communications link K) the corresponding output data A1' or A2' from the other regulator channel 20'. The procedure 48 carried out by the monitoring unit comprises a checking step with two monitoring actions 50, 52, and an evaluation step 54. The two monitoring actions 50, 52 may be carried out in any desired sequence successively, in parallel, or interleaved in one another.

As the first monitoring action 50, the monitoring unit uses the input data E to calculate its own estimate of the correct calculation results. By way of example, this estimate may comprise determination of upper and lower limits for the results to be expected. Alternatively, the monitoring unit can also calculate the actual control function, with less accuracy and/or using simplifying assumptions, in order to obtain an approximate result. The aim is for the estimate to require considerably less computation power than the actual calculation in the calculation unit. A channel-internal plausibility check of the calculation results is thus carried out in the first monitoring action 50. Any infringement of the upper and lower boundaries or any error between the estimate and the result originating from the calculation unit is output qualitatively or quantitatively in the form of fault data X1.

As the second monitoring action 52, the monitoring unit compares the calculation results supplied from the calculation unit with the corresponding results from the other regulator channel 20', which arrive via the communications link K. A channel-external check is thus carried out. Once again, fault data X2 are determined, which indicate the error between the calculation results in the two regulator channels 20, 20'.

In the exemplary embodiment described here, the output data A1 and A2 from the calculation unit are used for both monitoring actions 50, 52. In design alternatives, the actuating signals ST, the intermediate signals Z or other suitable calculation results or intermediate results can also be used instead of this for the estimate and monitoring action. The nature of the data being checked may differ in the monitoring actions 50, 52. Appropriate data from both regulator channels 20, 201 is of course, made available for the monitoring action 52.

Fault data X1, X2 are assessed in the evaluation step 54. In the present exemplary embodiment, a check is first of all carried out to determine whether both the monitoring actions 50, 52 are signaling a malfunction of the regulator channel 20. This is assumed if both fault data items X1, X2 each exceed a predetermined tolerance level. If only the monitoring action 52 responds, this indicates a malfunction in the other channel 201, while response of just the monitoring action 50 indicates either an unreliable simplification for the estimate of the calculation results, or a malfunction in the monitoring unit.

If both monitoring actions 50, 52 indicate that the results from the calculation unit are erroneous, a fault integrator in the monitoring unit starts an integration process in step 54. The integration rate depends on the extent to which the fault data X1, X2 exceed the tolerance limits. In this case, any desired assessment function may be used in order to take account, for example, of considerable errors to a greater extent. The assessment function may have a discontinuous or a stepped profile. In design alternatives, the weighting of the fault data X1, X2 and/or the consideration of a permissible tolerance band for the comparison results may be carried out prior to this, in conjunction with the calculation steps 50, 52.

If the fault integrator in the monitoring unit exceeds a predetermined signaling level (for example the value 1-00), then, finally, the fault signal F11 or F21 (depending on which processor unit 22, 24 is operating as the monitoring unit) is activated in step 54. If there is then no longer any malfunction in the monitoring actions 50, 52, then the value of the fault integrator is reduced at a predetermined decay rate (for example one unit per control cycle). The calculation unit is assessed as being serviceable once again as soon as the contents of the fault integrator fall below a predetermined minimum value (for example the value 0). The integration of the fault data X1, X2 thus takes account of singular and recurring malfunctions in the calculation unit in a reasonable manner.

When carrying out step 46, the task of the channel selection unit 40 is, as far as possible, to prevent erroneous calculation data from having any influence on the actuating signals ST which are produced. To this end, the channel selection unit 40 evaluates the fault signals F11, F12, F13, F21, F22 and F23. During uninterrupted fault-free operation of the regulator channel 20, none of these fault signals are active. The channel selection unit 40 then passes on the intermediate signals Z, without changing them, as actuating signals ST to the actuators 14.

If there is any defect in the first regulator channel 20, this is indicated by an active fault signal F11, F12, F13, F21, F22 or F23. The channel selection units 40, 401 then carry out a channel changeover. This means that the intermediate signals Z which have been influenced by the erroneous calculation unit are rejected, in that the switches in the channel selection unit 40, which are shown schematically in FIG. 2, open. Instead of this, the switches in the channel selection unit 40' close, so that the intermediate signals Z' from the second channel 20' are output as actuating signals ST'.

The first channel 20 is once again assessed as being fault-free once all the fault signals F11, F12, F13, F21, F22 and F23 have been deactivated. The channel selection unit 40 then once again switches the first channel 20 such that it is ready to carry out the monitoring via the actuating signals ST. However, in the exemplary embodiment described here, the actual control process remains with the second channel 201 until the second channel 20' initiates a channel changeover on the basis of a fault scenario within itself, or on the basis of a manual command, such as a pilot's command. In this case, the channel selection unit 40 receives an appropriate signal via the bidirectional link W from the channel selection unit 401. In design alternatives, on the other hand, the channel selection unit 40 switches control of the actuating signals ST back to the first channel 20 immediately after deactivation of all the fault signals (or after a certain delay time).

The result of this is that the interaction of the two channel selection units 40, 40' means that erroneous calculations in one channel 20, 20' do not influence the actuating signals ST, ST' produced by it. The two channel selection units 40, 40' are of identical design and operate substantially independently of one another. They are in contact with one another only via the bidirectional link W. Overall, the interconnection of the channel selection units 40, 401 results in the described flipflop effect. The channel selection units 40, 40' are designed such that they carry out safe reversionary operation in the event of an internal malfunction.

What is claimed is:

1. An engine regulator, comprising:
two regulator channels, each one of the two regulator channels including at least two processor units, wherein in each regulator channel:

one of the at least two processor units operates as a calculation unit for each safety-critical function in both of the two regulator channels in order to determine calculation results from at least some input data, and another one of the at least two processor units operates as a monitoring unit in order to compare the calculation results from the calculation unit firstly with a channel-internal estimate of correct results and secondly with corresponding channel-external results from a respective other of the two regulator channels.

2. The engine regulator according to claim 1, wherein:

the engine regulator corresponds to an aeroengine.

3. The engine regulator according to claim 1, wherein:

each monitoring unit integrates errors determined in the comparisons and produces a fault signal if an integrated error value indicates a malfunction.

4. The engine regulator according to claim 3, wherein:

each monitoring unit allows the integrated error value to decay gradually if no further errors are determined in the comparisons.

5. The engine regulator according to claim 1, wherein:

each monitoring unit reacts to errors determined in the comparisons only if both the comparison with the estimate of the correct results and the comparison with the corresponding results from the respective other regulator channel indicate a malfunction.

6. The engine regulator according to claim 1, wherein:

the calculation results are checked and correspond to output data from each calculation unit.

7. The engine regulator according to claim 1, further comprising:

a nominal-value conditioning device for determining the input data from actual-value signals from sensors of an engine assembly to be regulated, and from nominal-value signals.

8. The engine regulator according to claim 1, further comprising:

at least one channel selection unit for producing actuating signals for actuators for an engine assembly to be regulated, wherein:

the at least one channel selection unit excludes the calculation results identified as being faulty from influencing the actuating signals.

9. An engine, comprising:

an engine assembly; and an engine regulator including:

two regulator channels, each one of the two regulator channels including at least two processor units, wherein in each regulator channel:

one of the at least two processor units operates as a calculation unit for each safety-critical function in both of the two regulator channels in order to determine calculation results from at least some input data, and another one of the at least two processor units operates as a monitoring unit in order to compare the calculation results from the calculation unit firstly with a channel-internal estimate of correct results and secondly with corresponding channel-external results from a respective other of the two regulator channels.

10. The engine according to claim 9, wherein:

the engine corresponds to an aeroengine.

11. A method for regulating an engine that includes an engine regulator and two regulator channels, each regulator channel including at least two processor units, the method being performed for every safety-critical function in both regulator channels and comprising the steps of:

determining calculation results from at least some input data in accordance with in each case one of the at least two processor units operating as a calculation unit;

monitoring the calculation results of the calculation unit in accordance with in each case another one of the at least two processor units operating as a monitoring unit;

comparing the calculation results firstly with a channel-internal estimate of correct results and secondly with corresponding channel-external results from a respective other of the two regulator channels; and evaluating errors determined in both comparisons in order to produce a fault signal.

12. The method according to claim 11, wherein:

the engine corresponds to an aeroengine.

13. A regulator for safety-critical, very high reliability applications, comprising:

two regulator channels, each regulator channel including at least two processor units, wherein in each regulator channel:

one of the at least two processor units operates as a calculation unit for each safety-critical function in both regulator channels in order to determine calculation results from at least some input data, and another one of the at least two processor units operates as a monitoring unit in order to compare the calculation results of the calculation unit firstly with a channel-internal estimate of correct results, and secondly with corresponding channel-external results from a respective other of the two regulator channels.

14. The regulator according to claim 13, wherein:

each monitoring unit integrates errors determined during the comparisons and produces a fault signal if an integrated error value indicates a malfunction.

15. The regulator according to claim 14, wherein:

each monitoring unit allows the integrated error value to decay gradually if no further errors are determined in the comparisons.

16. The regulator according to claim 13, wherein:

each monitoring unit reacts to errors determined in the comparisons only if both the comparison with the estimate of the correct results and the comparison with the corresponding results from the respective other regulator channel indicate a malfunction.

17. The regulator according to claim 13, wherein:

the calculation results are checked and correspond to output data from each calculation unit.

18. The regulator according to claim 13, further comprising:

a nominal-value conditioning device for determining the input data from actual-value signals from sensors of an engine assembly to be regulated, and from nominal-value signals.

19. The regulator according to claim 13, further comprising:

at least one channel selection unit for producing actuating signals for actuators for an engine assembly to be regulated, wherein:

the at least one channel selection unit excludes the calculation results identified as being faulty from influencing the actuating signals.

20. A method for regulating one of an actuating system and a propulsion system that includes an engine regulator and two regulator channels, each regulator channel including at least two processor units, the method being performed for every safety-critical function in both regulator channels and comprising the steps of:

determining calculation results from at least some input data in accordance with in each case one of the at least two processor units operating as a calculation unit;

monitoring the calculation results of the calculation unit in accordance with in each case another one of the at least two processor units operating as a monitoring unit;

comparing the calculation results firstly with a channel-internal estimate of correct results and secondly with corresponding channel-external results from a respective other of the two regulator channels; and evaluating errors determined in both comparisons in order to produce a fault signal.

21. The method according to claim 20, wherein:

the propulsion system corresponds to an aeroengine.

* * * * *

UNITED STATES PATENT AND TRADEMARK OFFICE
CERTIFICATE OF CORRECTION

PATENT NO. : 6,480,780 B1
DATED : November 12, 2002
INVENTOR(S) : Friedrich Schwamm It is certified that error appears in the above-identified patent and that said Letters Patent is hereby corrected as shown below:

Column 3,
Lines 27-28, change "absolutely essential" to -- required --;
Line 54, before "invention" insert -- present --; and Column 4,
Line 6, change "ST'for" to -- ST' for --.

Signed and Sealed this

Third Day of August, 2004

JON W. DUDAS
*Acting Director of the United States Patent and Trademark Office*